US009557449B2

(12) United States Patent
Valeri

(10) Patent No.: US 9,557,449 B2
(45) Date of Patent: Jan. 31, 2017

(54) CURABLE COATING COMPOSITION

(75) Inventor: Robert Alan Valeri, Tampa, FL (US)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 29 days.

(21) Appl. No.: 14/370,298

(22) PCT Filed: Jan. 3, 2012

(86) PCT No.: PCT/US2012/020038
§ 371 (c)(1),
(2), (4) Date: Jul. 2, 2014

(87) PCT Pub. No.: WO2013/103334
PCT Pub. Date: Jul. 11, 2013

(65) Prior Publication Data
US 2014/0342100 A1    Nov. 20, 2014

(51) Int. Cl.
| C08K 5/54 | (2006.01) |
| G02B 1/10 | (2015.01) |
| B05D 3/06 | (2006.01) |
| G02B 1/12 | (2006.01) |
| C08K 5/5435 | (2006.01) |

(52) U.S. Cl.
CPC ............. G02B 1/105 (2013.01); B05D 3/067 (2013.01); G02B 1/12 (2013.01); C08K 5/5435 (2013.01)

(58) Field of Classification Search
CPC ....... C09D 4/00; C09D 163/00; C09D 11/104; C09D 11/101; C09D 135/02; B05D 3/067; G02B 1/105; C08K 5/5435
See application file for complete search history.

(56) References Cited

U.S. PATENT DOCUMENTS

| 4,211,823 A * | 7/1980 | Suzuki et al. ............ C08K 3/36 427/164 |
| 4,977,198 A | 12/1990 | Eckberg |
| 5,015,523 A * | 5/1991 | Kawashima et al. ................ B29D 11/00009 427/162 |
| 5,385,955 A * | 1/1995 | Tarshiani et al. ........ C09D 4/00 351/159.01 |
| 6,100,313 A | 8/2000 | Treadway |
| 6,103,352 A * | 8/2000 | Takahashi ............... B32B 27/00 428/195.1 |
| 6,632,535 B1 * | 10/2003 | Buazza et al. ... B29D 11/00442 427/164 |
| 6,780,232 B2 | 8/2004 | Treadway |
| 7,037,585 B2 | 5/2006 | Treadway |
| 7,514,482 B2 * | 4/2009 | Treadway ............ C08G 59/306 427/515 |
| 2004/0234789 A1 | 11/2004 | Treadway |
| 2007/0021523 A1 * | 1/2007 | Treadway ............ C08G 59/306 522/71 |
| 2008/0047468 A1 | 2/2008 | de Rojas |
| 2008/0311408 A1 * | 12/2008 | Treadway ............ C08G 59/306 428/447 |
| 2009/0186224 A1 * | 7/2009 | Lafaysse et al. .... C08G 59/306 428/391 |
| 2010/0068539 A1 * | 3/2010 | Treadway ............ C08G 59/306 428/447 |
| 2010/0190010 A1 * | 7/2010 | Treadway ............ C08G 59/306 428/412 |
| 2012/0015191 A1 * | 1/2012 | Treadway ............ C08G 59/306 428/412 |
| 2012/0315486 A1 * | 12/2012 | Treadway ............ C08G 59/306 428/412 |

FOREIGN PATENT DOCUMENTS

| CN | 101955698 | 1/2011 |
| JP | 59140267 A | 8/1984 |
| JP | 2006251536 A | 9/2006 |
| WO | 2006085839 A1 | 8/2006 |

OTHER PUBLICATIONS

Database WPI, "Termosetting composition for protective film of color filter, has preset ratio of taper angles formed from side face and substrate plane of application layer edge portion on substrate, before and after heating", Week 200673, 2006, XP002680883.
Database WPI, "Photocurable epoxy! resin for protectively coating shaped glass—includes organo silicon monomer and photosensitive aromatic onium salt of GP=VIA element", Week 198438, 1984, XP002680884.
International Search Report, dated Aug. 7, 2012, from corresponding PCT application.

* cited by examiner

Primary Examiner — Sanza McClendon
(74) Attorney, Agent, or Firm — Young & Thompson

(57) ABSTRACT

UV curable coating composition includes a non hydrolyzed epoxy- alkoxy-silane, polyfunctional acrylate and/or epoxy compounds and a cationic and/or free-radical photo-initiator; with polyfunctional acrylate and/or epoxy compounds representing more than 40 weight % of the total dry matter and the composition being without any hydrolyzed epoxy-alkoxy-silane. This composition is coated and cured on an optical substrate.

15 Claims, No Drawings

CURABLE COATING COMPOSITION

BACKGROUND OF THE INVENTION

Field of The Invention

The present invention relates to a UV curable coating composition and a method for manufacturing UV-cured hard coatings.

Description of The Related Art

Epoxysilane based coating are known to be used in the optical industry for providing abrasion resistant coatings. However, to be efficient, the coating must not only have abrasion resistant properties but also good adhesion properties to the support. A coating composition is generally specifically adapted to one type of substrate and does not provide sufficient adhesion properties on other substrates. For example, in the optical industry, two types of coatings are used to satisfy the condition of good adhesion on both thermoplastics and thermosets: an acrylate based coating will typically provide good adhesion on thermoplastic like substrates while an epoxy based coating is known to provide good adhesion on thermoset like substrates. Primers have also been provided for improving the adhesion of abrasion resistant coatings on different substrates. However, by using such a solution an additional layer has to be applied between the substrate and the abrasion resistant coating, resulting in increasing the manufacturing costs.

Therefore, there is a need to provide optical laboratories with a UV curable monolayer coating that can be applied to ophthalmic lenses that exhibit a high level of abrasion and scratch resistance as well as good adhesion properties regardless the nature of the substrate, in particular to both thermoplastic and thermoset lens substrates, without the need of a primer.

SUMMARY OF THE INVENTION

The present invention is based on the findings that it is possible to prepare excellent UV-cured transparent hard-coatings having good adhesion properties on both thermoplastic and thermoset lens substrates, by using a non hydrolyzed (epoxy)(alkoxy)silane in combination with high concentrations of polyfunctional acrylate monomer and/or polyfunctional epoxy compound in the hard coating. It has been surprisingly found that the adhesion of the final hard coatings is improved by using (epoxy)(alkoxy)silane monomers that are not subjected to hydrolysis before UV curing.

This was rather surprising since several documents drawn to the preparation of UV curable hard-coatings on ophthalmic lenses explicitly teach hydrolyzing epoxysilane monomers in a UV curable composition before the step of UV curing.

For example U.S. Pat. Nos. 6,100,313 6,780,232 and 7,037,585 disclose methods for preparing epoxy based hard-coatings on optical substrates, comprising a step of completely hydrolyzing a portion of the epoxy-functional alkoxysilanes followed by addition of non-hydrolyzed epoxy-functional silane to reduce viscosity and increase stability of the coating composition. Similarly, US 2008/0047468 discloses a method for preparing UV cured, easily tintable hard-coatings, said method comprising, as a first step, the hydrolysis of the trialkoxysilane monomers in the coating solution.

The present inventors have found that is was not only possible to prepare UV cured transparent hard-coatings without previously hydrolyzing the trialkoxysilanes, thereby preventing the viscosity problems described in the above prior art documents, but that the absence of hydrolysis could improve the adhesion performance of the coating on both thermoplastic and thermoset lens substrates.

The present invention is therefore drawn to a UV curable coating composition comprising:
 a) at least one non hydrolyzed (epoxy)(alkoxy)silane;
 b) at least one polyfunctional acrylate monomer and/or polyfunctional epoxy compound, different from a);
 c) at least one free radical photoinitiator and/or cationic photoinitiator; characterized in that the total amount of said b) is more than 40 wt %, relative to the total dry matter of the composition; and said composition does not comprise of any hydrolyzed (epoxy)(alkoxy)silane, and preferably any hydrolyzed alkoxysilane.

The present invention is also drawn to a method for manufacturing UV-cured hard-coatings, comprising
 a) coating an organic or mineral optical substrate with a curable composition as defined in the present invention;
 b) curing the resulting coating by irradiation with UV-radiation, said method not comprising any hydrolysis step before the UV curing step.

DETAILED DESCRIPTION OF THE INVENTION

In the present application when it is specified that the curable composition "does not comprise of any hydrolyzed (epoxy)(alkoxy)silane", that the (epoxy)(alkoxy)silane monomers are cured in the "non hydrolyzed form" or when the method is defined as "not comprising any hydrolysis step before the UV curing step", this means that when the monomer solution is submitted to the irradiation step, at least 90%, preferably at least 95%, and even more preferably at least 98% of the alkoxy groups of the (epoxy)(alkoxy) silanes are still covalently bound to the silicon atom and have not been hydrolyzed to silanol groups.

The epoxyalkylalkoxysilanes used in the present invention are preferably selected from glycidyl($C_{1-3}$ alkyl)-($C_{1-3}$ alkyl)-di($C_{1-3}$ alkoxy)silanes and glycidyl($C_{1-3}$ alkyl)-tri($C_{1-3}$ alkoxy)silanes. Hydrolysis of the $C_{1-3}$ alkoxy groups releases volatile alcohols (methanol, ethanol, propanol) which are easily evaporated from the curing coating composition. The (epoxy)(alkoxy)silane is advantageously 3-glycidoxypropyl-methyldiethoxysilane and/or 3-glycidoxypropyl-trimethoxysilane. The total amount of (epoxy)(alkoxy)silane is preferably from 20 (inclusive) to 60 (exclusive) weight %, more preferably from 25 to 58 weight %, even more preferably from 30 to 55 weight %, relative to the total dry matter of the composition.

The coating composition comprises, in addition to the above (epoxy)(alkoxy)silane, more than 40 weight %, preferably from 45 to 80 weight %, more preferably from 50 to 70 weight %, relative to the total dry matter of the composition, of at least one polyfunctional acrylate monomer and/or polyfunctional epoxy compound. In a particular embodiment, the curable composition comprises from 0 to 80 weight %, preferably from 25 to 70 weight %, more preferably from 30 to 60 weight % of at least one polyfunctional acrylate monomer and from 0 to 40 weight %, preferably from 2 to 30 weight %, more preferably from 5 to 25 weight % of at least one polyfunctional epoxy compound, relative to the total dry matter of the composition, provided that the total amount of polyfunctional acrylate monomers and/or polyfunctional epoxy compounds is more than 40 weight %.

The polyfunctional acrylate monomer may be selected from the group consisting of diacrylate, triacrylate, tetraacrylate and hexaacrylate monomers, such as pentaerythritol triacrylate or pentaerythritol tetraacrylate. In particular, the polyfunctional monomer is preferably selected from the group consisting of 1,4-butanedioldiacrylate, 1,6-hexanedioldiacrylate, dipropyleneglycol diacrylate pentaerythritol triacrylate, pentaerythritol tetraacrylate, dipentaerythritol tetraacrylate, dipentaerythritol hexaacrylate, silicone hexaacrylate, and mixtures thereof. The addition of polyfunctional acrylate monomers results in improved scratch resistance and better adhesion to thermoplastic substrates.

The polyfunctional epoxy compound may be selected from the group consisting of diglycerol tetraglycidyl ether, dipentaerythritol tetraglycidyl ether, sorbitol polyglycidyl ether, polyglycerol polyglycidyl ether, pentaerythritol polyglycidyl ether such as pentaerythritol tetraglycidyl ether, trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-epoxycyclohexane) methyl 3,4-epoxycylohexylcarboxylate and mixtures thereof. Addition of such polyepoxides improves toughness of the resulting cured coating and adhesion to thermoset resin substrates.

The molar ratio between the total amount of epoxy functions, including the epoxy functions of the (epoxy)(alkoxy)silane, and the total amount of acrylate functions is preferably from 0.1 to 3, more preferably from 0.2 to 2, even more preferably from 0.3 to 1.

When polyfunctional acrylate monomers are used in combination with the (epoxy)(alkoxy)silane, the coating composition contains at least one free radical photo-initiator, preferably from 1% to 15% by weight, more preferably from 1.5 to 10% by weight, relative to the polyfunctional acrylate monomers, of a free radical photo-initiator. Such free radical photo-initiators can be selected for example from haloalkylated aromatic ketones such as chloromethylbenzophenones; some benzoin ethers such as ethyl benzoin ether and isopropyl benzoin ether; dialkoxyacetophenones such as diethoxyacetophenone and α,α-dimethoxy-α-phenylacetophenone; hydroxy ketones such as (1-[4-(2-hydroxyethoxy)-phenyl] -2-hydroxy-2-methyl-1-propan-1-one) (Irgacure® 2959 from CIBA), 1-hydroxy-cyclohexyl-phenyl-ketone (Irgacure® 184 from CIBA) and 2-hydroxy-2-methyl-1-phenylpropan-1-one (such as Darocur® 1173 sold by CIBA); alpha amino ketones, particularly those containing a benzoyl moiety, otherwise called alpha-amino acetophenones, for example 2-methyl 1-[4-phenyl]-2-morpholinopropan-1-one (Irgacure® 907 from CIBA), (2-benzyl-2-dimethyl amino-1-(4-morpholinophenyl)-butan-1-one (Irgacure® 369 from CIBA); monoacyl and bisacyl phosphine oxides and sulphides, such as phenylbis(2,4,6-trimethylbenzoyl)-phosphine oxide (Irgacure® 819 sold by CIBA); triacyl phosphine oxides; liquid photoinitiator blends (such as GENOCURE LTM sold by Rahn Usa Corp.) and mixtures thereof Similarly, polyfunctional epoxy monomers are used in combination with at least one cationic photoinitiator, which may be selected from triarylsulfonium salts, diaryliodonium salts or mixtures thereof, preferably triarylsulfonium salts. The triarylsulfonium or diaryliodonium salts used in the present invention advantageously have counter-ions of low nucleophilicity and are preferably selected from triarylsulfonium hexafluoroantimonate, triarylsulfonium hexafluorophosphate, diaryliodonium hexafluoroantimonate and diaryliodonium hexafluorophosphate salts. Triarylsulfonium hexafluoroantimonate is available for example from Dow Chemical Company under the trademark CYRACURE™ UVI-6976 (50% by weight in propylene carbonate). Triarylsulfonium hexafluorophosphate is available for example from Dow Chemical Company under the trademark CYRACURE™ UVI-6992 (50% by weight in propylene carbonate). Diaryliodonium hexafluorophosphate is available for example from Ciba Specialty Chemicals, under the reference IRG-250, or from Aldrich under the reference 548014. Diaryliodonium hexafluoroantimonate is available for example from Sartomer Company under the reference Sar-Cat CD 1012. The curable composition according to the invention comprises preferably at least 1% by weight, preferably from 1% by weight to 15% by weight, more preferably from 1.5% to 10% by weight, relative to the total dry matter of the composition, of cationic photoinitiator.

The curable composition may comprise other non hydrolyzed alkoxysilanes in addition to the (epoxy)(alkoxy)silane. These alkoxysilanes are preferably selected from the group consisting of dialkyl-dialkoxysilanes, alkyl-trialkoxysilanes, alkenyl-trialkoxysilanes and mixture thereof The alkoxysilane is preferably vinyltrimethoxysilane.

Colloidal silica particles may be added to the coating composition in an amount of up to 50 weight %, preferably from 5 to 30 weight %, relative to the total dry matter of the composition. Addition of colloidal silica results in enhanced abrasion resistance.

The curable composition of the present invention advantageously further comprises small amounts, preferably from 0.05 to 1.5% by weight, more preferably 0.1 to 1% by weight of at least one surfactant. The surfactant is important for good wetting of the substrate resulting in satisfactory cosmetics of the final hard-coating. Said surfactant can include for example poly(alkyleneglycol)-modified polydimethylsiloxanes or polyheptamethylsiloxanes, or fluorocarbon-modified polysiloxanes. The curable composition preferably contain from 0.1% to 0.3% of a fluorocarbon-modified polysiloxane, such as the commercial product EFKA® 3034 sold by Ciba Specialty Chemicals.

In some cases, for example when the coating composition contains high amounts of colloidal particles, it may be necessary to use an organic solvent to control viscosity or for improving the cosmetic flow. The amount of organic solvent (s) preferably does not exceed 30% by weight of the coating composition. The solvent is for example selected from alcohols, glycol ethers, polyols and mixtures thereof. However, the composition of the present invention is preferably free of solvent so that the coating could be used in coating equipment that circulates the coating after dispensing. This reduces the amount of coating used per lens as only the coating that is cured on the lens is used and the remaining coating that was dispensed is circulated back into the coating reservoir. This also eliminates VOCs and hazardous chemical waste.

As explained in the introduction of the present application, the inventors have found that it was not necessary and even unsuitable to hydrolyze the alkoxysilanes, for example by addition of acid or basic catalysts, before submitting the composition to UV photocuring. In other words, in the composition of the invention coated onto the optical substrate is essentially free of hydrolyzed (epoxy)(alkoxy) silanes and hydrolyzed alkoxysilanes. Not hydrolyzing the alkoxy groups of the monomers before application onto the substrate not only results in improved adhesion performance, increased pot-life of formulations and tintability (especially on PC substrates, whose tintability is difficult to achieve), but also allows implementation of the method of the present invention without using any organic solvent. If necessary, the viscosity of the coating composition may easily be decreased by addition of polyfunctional low viscosity monomers such as a mixture of diacrylates and diepoxides.

The present invention is also drawn to a method for manufacturing UV-cured hard-coatings comprising the following step of:
  a) coating an organic or mineral optical substrate with a curable composition as defined in the present invention;
  b) curing the resulting coating by irradiation with UV-radiation, said method not comprising any hydrolysis step before the UV curing step.

In step (a) of the method of the present invention an optical substrate is coated with the composition defined above. The coating solution may be coated, for example by spin coating, dip coating, bar coating or spray coating, on any optical substrate whether organic or mineral. The selection of the optical substrate is not critical for the present invention since the curable composition of the invention exhibit good adhesion properties regardless the substrate. This substrate may be selected from, for instance: polyamides; polyimides; polysulfones; polycarbonates and copolymers of polycarbonate and poly(ethylene terephtalate); polyolefins such as polynorbornene; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; homo- and copolymers of thiometh) acrylic acid and esters thereof; homo- and copolymers of poly(thio)urethane; epoxy homo- and copolymers; and episulfide homo- and copolymers. The coating solution is coated onto the optical substrate with a dry layer coating thickness of between 1 and 20 µm, preferably of between 1.5 and 10 µm.

The method may comprise a drying step before the curing step, especially in case an organic solvent has been used.

After coating and optionally drying, the resulting optical substrate coated with the coating solution is submitted, without any prior hydrolysis step, to irradiation with UV light. The curing step (step (b)) comprises irradiating the coated layer with a UV radiation dosage ranging preferably from 0.150 J/cm$^2$ to 1.20 J/cm$^2$ in the UV-C range (290 nm-100 nm). Irradiation times ranged preferably from about 1 second to 10 seconds. Naturally, it is possible to achieve the same dosage range using a lower intensity bulb for a longer time. In step (b), the cationic photoinitiator and/or free radical photoinitiator initiate the polymerization of the epoxy functional monomers and the condensation of the alkoxysilane groups. In particular, when triarylsulfonium salt is used, the triarylsulfonium salt will cleave upon photolysis and produce an aryl radical and a diarylsulfonium cation-radical (see J. V. Crivello, D. A. Conlon, and J. L. Lee, "The Synthesis and Characterization of Cationic Photoinitiators Bearing Two and Three Photoactive Triarylsulfonium Groups in the Same Molecule", Polymer Bulletin 14, 279-286 (1985)). The diarylsulfonium cation-radical then generates, in subsequent reactions, strong Bronsted acids which initiate the cationic polymerization (epoxy ring opening) of the epoxy-functional monomers and simultaneously catalyze the hydrolysis and condensation of the alkoxysilane groups (sol-gel process) using atmospheric moisture during the photolysis. The reaction mechanism of diaryliodonium salts is very similar to that of triarylsulfonium salts.

The coating composition of the invention exhibits good adhesion properties on various substrates. The coating composition is preferably applied on thermoplastic and thermoset plastics such as polycarbonates, polyallylcarbonates, poly(thio)urethanes and acrylics.

EXAMPLE 1

Nine UV curable compositions have been prepared with the ingredients and amounts (weight percentages) as specified in Table 1.

The polyfuntional acrylate monomers and/or polyfunctional epoxy compounds were added one at a time to the glycidoxypropyltrimethoxysilane and glycidoxypropylmethyldiethoxysilane at ambient temperature and mixed until the solution was homogeneous.

Next, the GENOCURE LTM (photoinitiator blend from Rahn USA Corp.), the triarylsulfonium hexafluoroantinomate salts and the triarylsulfonium hexafluorophosphate salts were added as photoinitiators and the mixture was again stirred until homogeneity. Finally, the fluorocarbon modified siloxane surfactant was added and the final coating was mixed vigorously for 30 minutes to ensure homogeneity.

The solutions were then allowed to stir gently using a magnetic stir bar until all bubbles had disappeared.

The coating solution was spin coated to the faces of CR®-39 and polycarbonate (PC) lenses using a Headway® spin coater (spin application speed: 800 rpm, application time: 10 seconds; coating spread speed: 1200 rpm, spread spin time: 8 seconds). The coated lenses were then submitted to UV curing in a Fusion Systems® UV belt conveyor under the following conditions:

UV belt conveyor speed: 1.5 m/min (5 ft/min);
Fusion H$^+$ bulb;
UV dosage: UV-A: 1.926 J/m$^2$, UV-B: 1.513 J/cm$^2$, UV-C: 0.327 J/cm$^2$, UV-V: 1.074 J/cm$^2$;
UV power: UV-A: 1.121 W/m$^2$, UV-B: 0.850 W/cm$^2$, UV-C: 0.180 W/cm$^2$, UV-V: 0.602 W/cm$^2$;

The abrasion resistance was determined with the Bayer abrasion test. Determination of the Bayer value was performed in accordance with the standards ASTM F735-81 (Standard Test Method for Abrasion Resistance of Transparent Plastics and Coatings Using Oscillating Sand Method). Per this test, a coated lens and an uncoated lens (reference lens of similar curvature, diameter, thickness and diopter) were subjected to an oscillating abrasive sand box (approximately 500 g of aluminum oxide ZF 152412 supplied by Specialty Ceramic Grains, former Norton Materials) for 300 cycles of abrasion in 2 minutes. Only fresh aluminium oxide is used for each measurement. The haze H of both the reference and coated sample were then measured with a Haze Guard Plus meter, in accordance with ASTM D1003-00, before and after the test has been performed. The results are expressed as a calculated ratio of the reference lens to the coated lens (Bayer value=Hstandard/Hsample). The Bayer value is a measure of the performance of the coating, with a higher value meaning a higher abrasion resistance.

The scratch resistance was evaluated with the hand steel wood test. This test consist in abrading a lens with a steel wool performing 5 back and forth (with an amplitude from 4 to 5 cm) keeping an index finger constant pressure on the steel wool. Strength pressed on the steel wool can be evaluated with a balance: fix the lens on the balance plate with adhesive tape and press down the lens with the index finger exercising normally strength on the lens; This strength is about 5 Kg during the first way and about 2.5 Kg during the return way. Lenses are visually inspected and noted as follows: low resistance: 5; Acceptable area: 3; good resistance: 1. The higher is the note, the more abraded is the lens.

The haze value was measured with a Haze Guard XL-211 according to the standard method ASTM D 1003-00 on CR®-39 coated lenses.

The adhesion of the different hard-coat formulations was then evaluated on the various substrates. To do so, a crosshatch adhesion test (ISTM 02-010) was performed on the lenses in various conditions:

without specific conditioning of the lenses (test called "dry adhesion")
after having submitted the lenses to UV ageing for 2 periods of time of 40 h.

UV ageing was performed in a xenon test chamber Q-SUN® Xe-3 from Q-LAB at a relative humidity of 20% (±5%) and at a temperature of 23° C. (±5° C.). The lens was introduced in the chamber and the concave side was exposed to the light. The lens was exposed to UV during 40 h and then subjected to the crosshatch test. If the lens passed the test, it was subjected again to 40 h UV exposure.

According to crosshatch test ISTM 02-010, a mark from 0 to 5 was given to the lens. With mark 0 or 1, the lens was acceptable (pass), whereas marks 2 to 5 were not acceptable (did not pass).

Tintability is evaluated with light transmission properties, measured by means of a spectrophotometer:

The polycarbonate lenses were subjected on one face to BPI black dye at 96° C. for 15 minutes. Afterwards, the lenses were washed and the % transmission was read.

Table 2 below shows the results for the abrasion resistance, the scratch resistance, adhesion and tintability of the cured composition on PC and CR®-39 substrates.

TABLE 1

|  | 1 | 2 | 3 | 4 | 5 | 6 | 7 | 8 | 9 |
|---|---|---|---|---|---|---|---|---|---|
| Glycidoxypropyltrimethoxysilane | 42.77 | 28.21 | 22.19 | 51.26 | 38.60 | 36.38 | 53.67 | 54.03 | 54.03 |
| Glycidoxypropylmethyldiethoxysilane |  |  | 16.64 |  |  |  |  |  |  |
| Total epoxyalkoxysilanes | 42.77 | 28.21 | 38.83 | 51.26 | 38.60 | 36.38 | 53.67 | 54.03 | 54.03 |
| Vinyltrimethoxysilane | 10.69 |  |  |  |  |  |  |  |  |
| Dipentaerythritolhexaacrylate | 18.39 |  | 22.19 | 9.97 |  | 10.40 | 21.47 | 21.61 | 21.61 |
| Pentaerythritol tri- and tetra-acrylate | 10.12 | 10.49 |  |  | 5.51 |  |  |  |  |
| Dipentaerythritoltetraacrylate |  |  |  | 9.97 |  |  |  |  |  |
| 1,4-butanedioldiacrylate |  | 36.56 | 11.09 | 20.03 | 38.60 | 25.99 |  |  |  |
| 1,6-hexanedioldiacrylate | 7.13 |  | 11.09 |  | 11.03 |  | 10.73 | 10.81 | 10.81 |
| Dipropyleneglycoldiacrylate |  |  |  |  |  |  |  |  |  |
| Diacrylate oligomer |  |  |  |  |  | 10.40 |  |  |  |
| Silicon hexaacrylate |  | 0.54 | 0.55 | 0.13 | 0.55 | 0.52 | 0.72 | 0.07 | 0.07 |
| Polyfunctional acrylate monomers | 35.64 | 47.59 | 44.92 | 40.10 | 55.69 | 47.31 | 32.92 | 32.49 | 32.49 |
| Trimethylolpropane triglycidyl ether | 7.13 | 20.88 | 8.32 |  |  |  |  | 10.81 |  |
| Sorbitol aliphatic polyglycidyl ether |  |  |  |  |  | 5.20 | 10.73 |  | 10.81 |
| Polyfunctional epoxy compounds | 7.13 | 20.88 | 8.32 | 0 | 0 | 5.20 | 10.73 | 10.81 | 10.81 |
| Total polyfunctional acrylate and polyfunctional epoxy | 42.77 | 68.47 | 53.24 | 40.10 | 55.69 | 52.51 | 43.65 | 43.30 | 43.30 |
| Triarylsulfonium hexafluoroantimonate salts | 1.87 | 1.69 | 3.53 | 2.99 | 2.40 | 5.85 | 1.47 | 1.46 | 1.46 |
| Triarylsulfonium hexafluorophosphate salts | 0.62 | 0.56 | 1.18 | 1.00 | 0.80 | 1.95 | 0.49 | 0.49 | 0.49 |
| Total cationic photoinitiator | 2.49 | 2.25 | 4.71 | 3.99 | 3.20 | 7.80 | 1.96 | 1.95 | 1.95 |
| GENOCURE LTM - Free radical photoinitiator | 1.07 | 1.07 | 2.77 | 3.99 | 2.50 | 3.33 | 0.72 | 1.72 | 1.72 |
| Fluorocarbon modified siloxane | 0.21 |  | 0.44 | 0.66 |  |  |  |  |  |
| Ratio epoxy function/acrylate function (mol/mol) | 0.636 | 0.552 | 0.497 | 0.522 | 0.300 | 0.419 | 0.953 | 0.906 | 0.953 |

TABLE 2

|  | 1 | 2 | 3 | 4 | 5 | 6 | 7 | 8 | 9 |
|---|---|---|---|---|---|---|---|---|---|
| ISTM Bayer | 3.78 | 2.07 | 2.29 | 3.88 | 2.65 | 2.69 | 3.56 | 3.06 | 3.26 |
| Hand steel wool | 3 | 3 | 3 | 3 | 3 | 3 | 3 | 3 | 3 |
| Haze | 0.12 | 0.11 | 0.13 | 0.11 | 0.10 | 0.10 | 0.13 | 0.12 | 0.12 |
| Dry adhesion on PC (before Q-SUN) | Pass | Pass | Pass | Pass | Pass | Pass | Pass | Pass | Pass |
| Adhesion on PC after 80 hours Q-SUN | Pass | Pass | Pass | Pass | Pass | Pass | Pass | Pass | Pass |
| Dry adhesion on CR®-39 (before Q-SUN) | Pass | Pass | Pass | Pass | Pass | Pass | Pass | Pass | Pass |
| Adhesion on CR®-39 after 80 hours Q-SUN | Pass | Pass | Pass | Pass | Pass | Pass | Pass | Pass | Pass |
| Tintability (% of transmission on PC) | 61 | 18 | 35 | 58 | 60 | 24 | 61 | — | 47 |

As shown on table 2, all the coatings obtained with the compositions 1 to 9 exhibit good abrasion and scratch resistance as well as good adhesion properties on both PC and CR®-39 substrates. Furthermore, tintability on PC can be controlled, as can be seen from examples 6 and 7.

The invention claimed is:
1. A UV curable coating composition comprising:
   a) at least one non hydrolyzed epoxyalkoxysilane;
   b) at least one polyfunctional acrylate monomer and/or polyfunctional epoxy compound, different from said at least one non hydrolyzed epoxyalkoxysilane;
   c) at least one free radical photoinitiator and/or cationic photoinitiator;
   wherein the total amount of said at least one polyfunctional acrylate monomer and/or polyfunctional epoxy compound is more than 40 weight %, relative to the total dry matter of the composition; the total amount of said at least one non hydrolyzed epoxyalkoxysilane is from 20 to less than 60 weight % relative to the total dry matter of the composition; and
   said composition does not comprise any hydrolyzed epoxyalkoxysilane.
2. The composition according to claim 1, wherein the molar ratio between the total amount of epoxy functions and the total amount of acrylate functions is from 0.1 to 3.
3. The composition according to claim 1, wherein said epoxyalkoxysilane is selected from the group consisting of glycidyl ($C_{1-3}$ alkyl)-($C_{1-3}$ alkyl)-di($C_{1-3}$ alkoxy) silanes and glycidyl ($C_{1-3}$ alkyl)-tri ($C_{1-3}$ alkoxy) silanes, 3-glycidoxypropyl-methyldiethoxysilane and 3-glycidoxypropyltrimethoxysilane.
4. The composition according to claim 1, wherein said polyfunctional acrylate monomer is selected from the group consisting of 1,4-butanedioldiacrylate, 1,6-hexanedioldiacrylate, dipropyleneglycol diacrylate pentaerythritol triacrylate, pentaerythritol tetraacrylate, dipentaerythritol tetraacrylate, dipentaerythritol hexaacrylate, silicone hexaacrylate, and mixtures thereof; and said polyfunctional epoxy compound is selected from the group consisting of diglycerol tetraglycidyl ether, dipentaerythritol tetraglycidyl ether, sorbitol polyglycidyl ether, polyglycerol polyglycidyl ether, pentaerythritol polyglycidyl ether such as pentaerythritol tetraglycidyl ether, trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-Epoxycyclohexane) methyl 3,4-epoxycylohexylcarboxylate, and mixtures thereof.
5. The composition according to claim 1, wherein the total amount of cationic photoinitiator is from 1 to 15 weight %, relative to the total dry matter of the composition, and the total amount of free radical photoinitiator is from 1 to 15 weight %, relative to the total amount of polyfunctional acrylate monomers.
6. The composition according to claim 1, wherein said cationic photoinitiator is selected from the group consisting of triarylsulfonium hexafluoroantimonate, triarylsulfonium hexafluorophosphate, diaryliodonium hexafluoroantimonate and diaryliodonium hexafluorophosphate salts, and mixtures thereof; and said free radical photoinitiator is selected from the group consisting of haloalkylated aromatic ketones, benzoin ethers, dialkoxyacetophenones, hydroxy ketones, alpha amino ketones, alpha-amino acetophenones, monoacyl and bisacyl phosphine oxides and sulphides, triacyl phosphine oxides, and mixtures thereof.
7. The composition according to claim 1, wherein said composition comprises a solvent.
8. The composition according to claim 1, wherein said composition comprises colloidal silica particles.
9. The composition according to claim 1, wherein said composition comprises from 0.05 to 1 weight %, relative to the total dry matter of the solution, of a surfactant.
10. The composition according to claim 1, wherein the total amount of said at least one polyfunctional acrylate monomer and polyfunctional epoxy compound is more than 40 weight %, relative to the total dry matter of the composition.
11. A method for manufacturing a UV-cured hard-coating, comprising
   a) coating an organic or mineral optical substrate with a curable composition as defined in claim 1;
   b) curing the resulting coating by irradiation with UV-radiation,
   said method not comprising any hydrolysis step before the UV curing step.
12. The method according to claim 11, wherein the substrate is selected from the group consisting of thermoplastic and thermoset substrates.
13. The method according to claim 11, wherein the substrate is selected from the group consisting of polycarbonates, homopolymers of diethylene glycol bis(allyl carbonate), polythiourethanes and acrylics.
14. The method according to claim 11, further comprising a step of drying of the coated layer before curing.
15. The method according to claim 11, wherein the curing step (b) comprises irradiating the coated layer with a UV radiation dosage ranging from 0.150 J/cm$^2$ to 1.20 J/cm$^2$ in the UV-C range, for about 1 to 10 seconds.

* * * * *